Feb. 16, 1932.   E. R. DERBY   1,845,249
METHOD OF EXTRUDING PLASTICS
Filed Aug. 14, 1930   2 Sheets-Sheet 1

Inventor:
Elmer R. Derby
By Macleod Calvr Copeland & Dike
Attorneys.

Feb. 16, 1932.   E. R. DERBY   1,845,249
METHOD OF EXTRUDING PLASTICS
Filed Aug. 14, 1930   2 Sheets-Sheet 2

Patented Feb. 16, 1932

1,845,249

UNITED STATES PATENT OFFICE

ELMER R. DERBY, OF SPRINGFIELD, MASSACHUSETTS, ASSIGNOR TO THE FIBERLOID CORPORATION, OF INDIAN ORCHARD, MASSACHUSETTS, A CORPORATION OF MASSACHUSETTS

METHOD OF EXTRUDING PLASTICS

Application filed August 14, 1930. Serial No. 475,360.

My present invention relates to a novel method of producing a smooth uniformly thick web of cellulose ester plastics, and I also disclose herein a preferred mechanism for practicing the process. The method, considered broadly, consists in extruding the plastic mass under pressure through a narrow orifice which is preferably annular, i. e., has inner and outer walls, which move in opposite directions and form a tube which is subsequently slitted longitudinally and opened into the form of a flat web. It has been found by practical experience with previous machines of this kind that the sheet produced was subject to variations in thickness and frequently contained minute waves which while not apparent to the eye and not affecting the value of the material for certain uses rendered it unfit for purposes where a sheet of perfect uniformity is required. It is extremely difficult to assign this effect to any one cause, but it seems probable that it is due to inaccuracies in the construction of the machine, or to the friction or surface tension of the nozzle on the sides of the sheet, or possibly to other causes. However, I have discovered that a much more uniform sheet which is freer from waves and differences in gauge can be produced by the herein described method embodying my present invention, in which the outer member of the nozzle is caused to rotate in one direction and the inner member or plug within the nozzle rotates in the opposite direction preferably with substantially equal speed, it being understood that the space between the two parts forms the orifice through which the tube is extruded. By this construction a very marked change in the character of the stock is produced and the gauge is rendered more uniform and the waves are practically eliminated.

Figure 1:
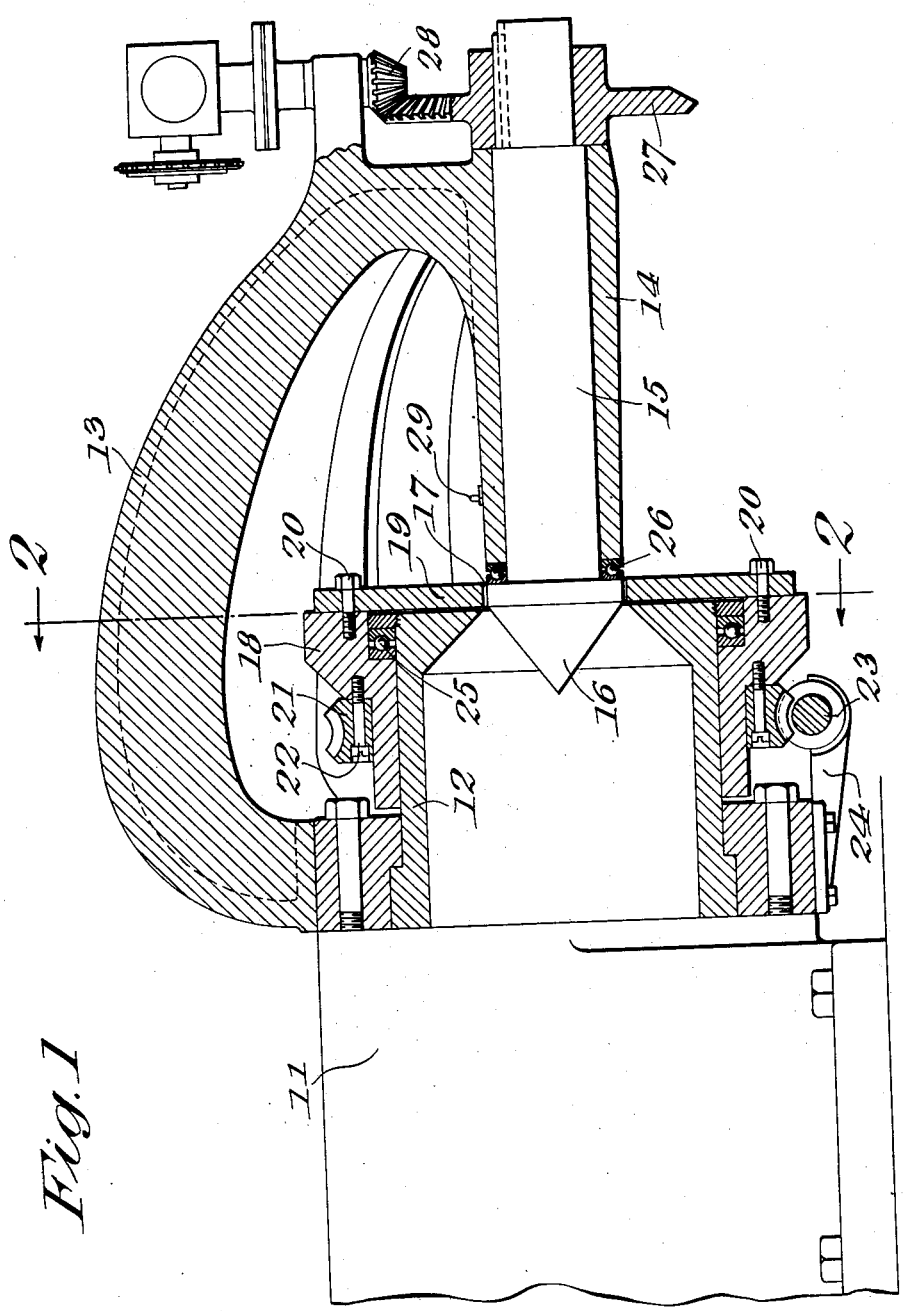
Fig. 1 is a longitudinal section of a nozzle embodying my invention.
Figure 2:
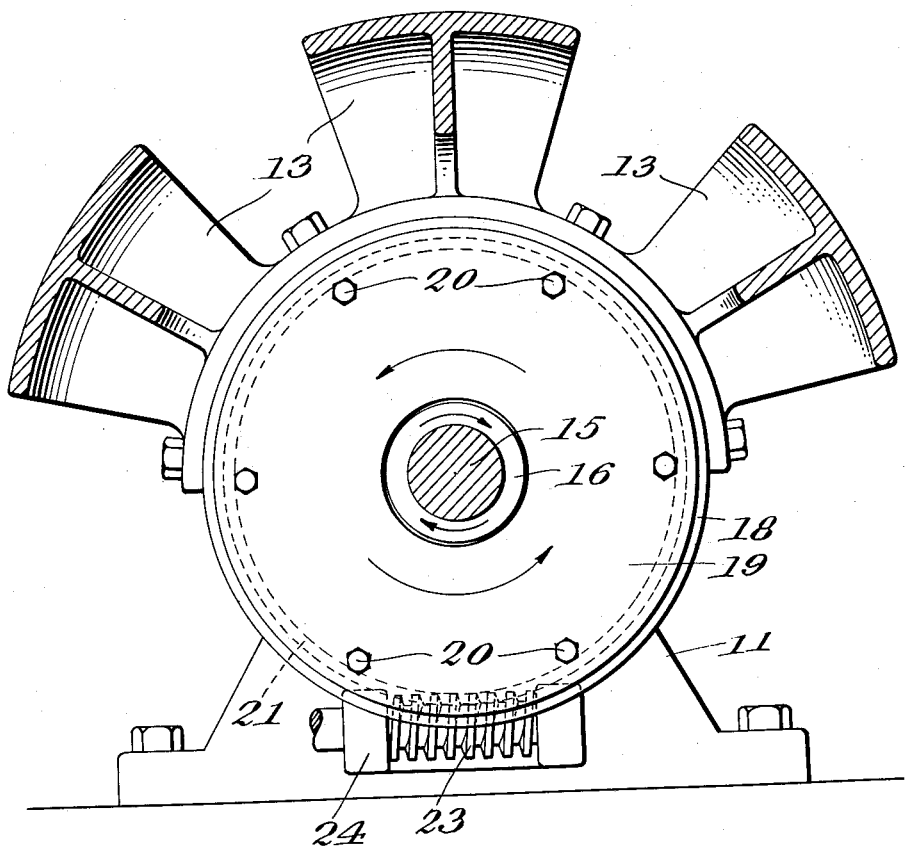
Fig. 2 is a section on line 2—2, Fig. 1.

Referring now to the drawings, at 11 is shown the feed cylinder of the press. At 12 is shown a stationary sleeve or bushing secured to the cylinder 11 and at 13 is shown an overhanging bracket or arm which is provided with a bearing 14. Mounted in the bearing 14 is a shaft 15, the inner end of which carries a conical plug 16 forming the inner wall of the orifice 17 through which a sheet is extruded. A bearing 26 is provided to take the thrust on the plug 16.

On the bushing 12 and capable of revolving on it is a ring 18 carrying a plate 19 which is secured to it by cap screws 20. The ring 18 also is provided with a worm gear 21 fixed thereto by screws 22 and engaged by a worm 23 carried by brackets 24. The ring 18 and the plate 19 revolve on the bushing 12 and the inner surface of the hole in the disk 19 surrounding the plug 16 forms the outer wall of the orifice 17 through which the stock is extruded to form the sheet. At 25 is shown a ball bearing to take the thrust of the load composed on the disk 19 by the pressure within the cylinder, these pressures being relatively high.

The plug 16 is revolved by a bevelled gear 27 and bevelled pinion 28. In the drawings I have not shown in detail the mechanism for revolving the bevelled pinion 28 or the worm 23 as these may be driven by any suitable mechanism. In practice, however, the disk 19 and the plug 16, are caused to revolve in opposite directions with substantially equal speed. By so doing the stock leaves the orifice without any tendency to revolve about the longitudinal axis of the tube. The stock is split by a knife 29 which is conveniently located on the bearing 14 forming part of the arm 13.

From the foregoing it will be seen that, as the stock leaves the orifice 17, it is acted upon in opposite directions at substantially equal speeds by the surface of the plug 16 and disk 19 which have the effect of removing any inequalities or variations as previously explained.

I claim:

1. The hereindescribed method of producing a smooth, uniformly thick web of pyroxylin which consists in extruding a plastic mass of suitable material through an orifice while moving the opposite walls forming the orifice in opposite directions transversely to the line of movement of the stock through the orifice.

2. The hereindescribed method of producing a smooth, uniformly thick web of pyroxylin which consists in extruding a plastic mass through an annular orifice while rotating the walls of the orifice in opposite directions as the stock passes between them.

3. The hereindescribed method of producing a smooth, uniformly thick web of pyroxylin which consists in extruding a plastic mass through an annular orifice while rotating the walls of the orifice at equal speeds in opposite directions as the stock passes between them.

In testimony whereof I affix my signature.

ELMER R. DERBY.